United States Patent [19]
Droll

[11] 3,762,017
[45] Oct. 2, 1973

[54] APPARATUS FOR DRAWING IN WOUND COILS INTO STATORS OF ELECTRICAL MACHINES AND THE LIKE

[76] Inventor: Hans Droll, Nordring 75, Boergen-Enkheim, Germany

[22] Filed: Apr. 21, 1972

[21] Appl. No.: 246,422

[52] U.S. Cl. .................................................. 29/205 R
[51] Int. Cl. .............................................. H02k 15/06
[58] Field of Search ....................... 29/205 R, 205 D, 29/205 C, 203 P, 203 J

[56] References Cited
UNITED STATES PATENTS

| | | | |
|---|---|---|---|
| 3,324,536 | 6/1967 | Hill | 29/205 R |
| 3,559,268 | 2/1971 | Droll | 29/205 R |
| 3,624,891 | 12/1971 | Droll | 29/205 R |

Primary Examiner—Thomas H. Eager
Attorney—Roberts B. Larson et al.

[57] ABSTRACT

An apparatus for drawing wound coils into the grooves of stators or the like. A stator support member is provided for holding the stator, positioning the same onto the circle of guide fingers and, after the wound coils have been inserted into the grooves of the stator, removing the stator and removing it laterally away from the circle of guide fingers to a withdrawn position at which the stator is arranged with its axis vertical and then released onto a conveyer, mandrel or the like. An alignment member is also mounted for movement between a withdrawn position away from the circle of guide fingers and an operative position on the axis of the guide fingers and movable between them to precisely position them as the wound coils are being drawn into the stator grooves.

12 Claims, 6 Drawing Figures

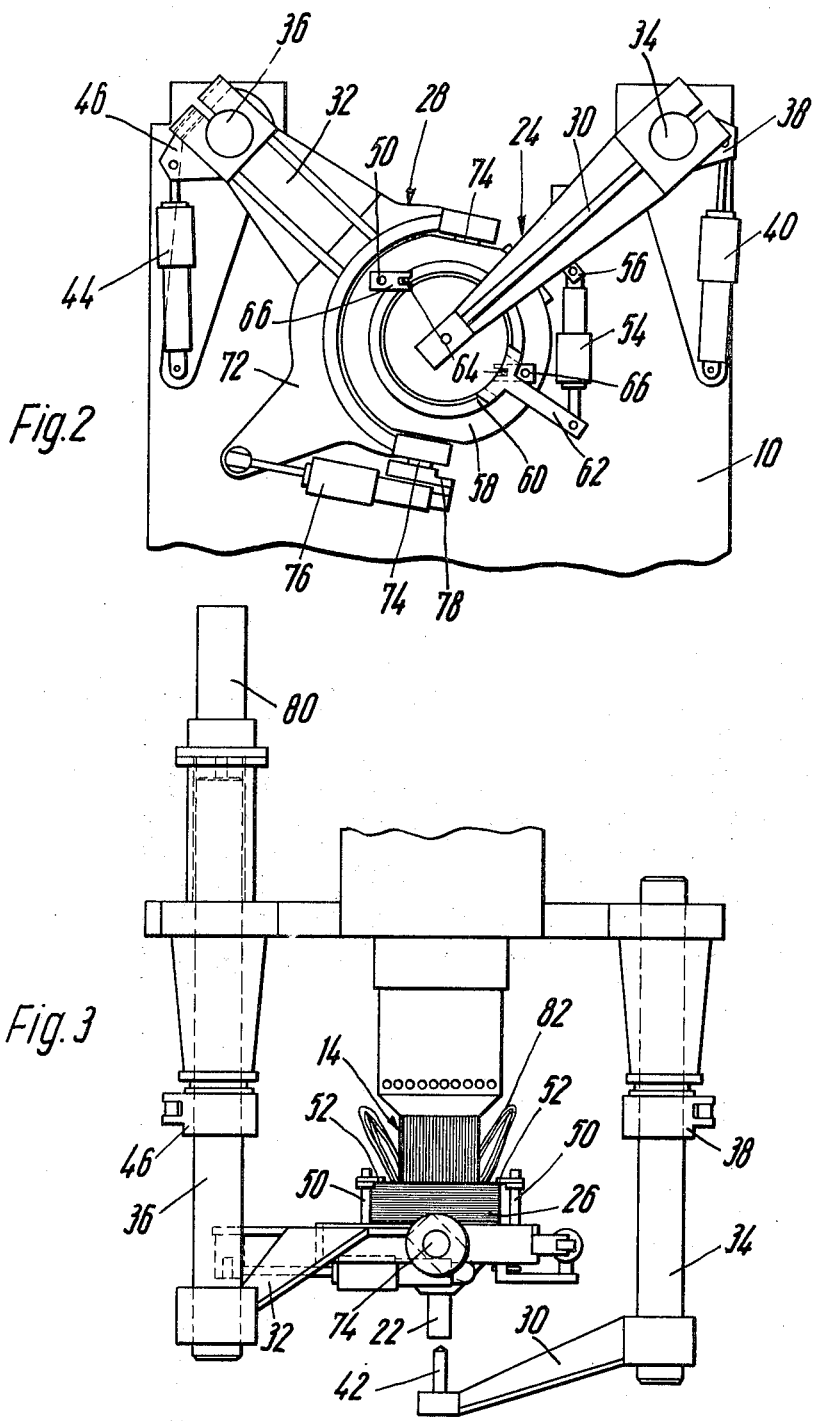

APPARATUS FOR DRAWING IN WOUND COILS INTO STATORS OF ELECTRICAL MACHINES AND THE LIKE

BACKGROUND OF THE INVENTION

This invention relates to an apparatus for drawing wound coils into stators for electrical machines and the like, and in particular it relates to a new and improved apparatus in which handling of the stator is greatly facilitated.

Previous apparatus for drawing wound coils into the grooves of stators are shown in my earlier U.S. Pat. Nos. 3,624,891 and 3,636,613, which patents shown an apparatus in which a circle of guide fingers are arranged such that the central axis thereof can be swivelled to different angles of inclination. The previous apparatus described and shown in the said patents also includes a pair of arms which simply push against the stator while on the guide fingers to hold the stator thereon. Not shown in the said previous patents, but known per se, is an aligning member which is placed into the circular space between the guide fingers after the wound coils have been hung on the guide fingers, the purpose of the aligning member being to precisely position the guide fingers as the stator is placed on the fingers and the wound coils are being drawn into the stator grooves. The actual movement of the coils into the stator grooves is caused by a stripper member which moves through the circle, or more precisely the cylinder formed by the guide fingers and through the stator. After the coils have been inserted into the appropriate stator grooves, this stripper member pushes the aligning member out of the circular space between the guide fingers. In the past, it had been necessary for the operator to catch this aligning member by hand, set it aside, remove the wound stator and then, after retracting the stripper member and placing new wound coils on the guide fingers, re-inserting the aligning member onto the guide fingers by hand.

The details of the guide fingers and the stripper member are known per se and will not be described in detail herein. However, for a more detailed description of the stripper member and the guide fingers, reference is made to the Hill U.S. Pat. No. 3,324,536, and to my previous U.S. Pat. No. 3,559,268.

In this previous apparatus, it was also necessary to move the stator by hand, first placing it onto the guide fingers of the drawing-in tool and then removing it by hand after the coils had been wound therein. The removal of the finished stator with the coils wound therein was a particularly burdensome task since the wound stator is very heavy. This task was somewhat facilitated by the structure shown in my U.S. Pat. No. 3,363,613, in accordance with which the axis of the guide fingers of the drawing-in tool could be swivelled to a convenient position, but even this did not eleviate completely the task of removing the wound stator by hand. Thus, there exists a need for a new and improved apparatus of the type described which will facilitate handling of the stator and/or the alignment member.

SUMMARY OF THE INVENTION

Thus, it is a purpose of this invention to provide a new and improved apparatus for drawing coils into grooves of stators for electrical machines or the like in which the handling of the stators and/or the alignment member is greatly facilitated, whereby disadvantages of the previous arrangements are overcome.

This purpose of the present invention is achieved by providing on the apparatus a stator support means which positively holds the stator while on the guide fingers and also while removing the wound stator from the guide fingers to a withdrawn position at which the wound stator can be removed, preferably by first arranging the wound stator with its axis vertical and then dropping the stator, thus oriented, onto a convenient receiving surface. There is also provided an alignment member support means for receiving the alignment member and carrying the same to a withdrawn position away from the axis of the drawing-in tool.

In the apparatus of my previous patents, a pair of arms were provided above the drawing-in tool and to each side thereof, the purpose of which arms was simply to exert a force on the stator holding the same in place while the coils are drawn into the stator grooves. In a preferred embodiment of the present invention, these two arms of my previous apparatus are replaced, one by the stator support means and the other by the alignment member support means.

In a preferred embodiment of the invention, the stator support means will include a mounting ring which includes means to grasp both axial sides of the stator and firmly hold the same on the guide fingers during the coil inserting procedure. After this has been completed, the stator support means carries the mounting ring with the stator still held therein to a withdrawn position. The mounting ring is so held in a swivel arm of the stator support means that at the withdrawn position, it is turnable about an axis which is horizontal, regardless of the angle of inclination of the frame holding the shaft about which the swivel arm turns. Consequently, at this withdrawn position the mounting ring can be turned about this horizontal axis until the stator is arranged vertically as described above. At this time, the means holding the stator are automatically released, thus permitting the said falling movement of the wound stator.

In accordance with another feature of the invention, means are provided for automatically handling the alignment member at the completion of the drawing-in procedure so that the alignment member need not be held by hand, but rather, so that it can be moved aside automatically, thus freeing the operator from the task of handling this alignment member and permitting him instead to use this time to obtain and place on the guide fingers another unwound stator and to permit the insertion onto the guide fingers either automatically or by hand of a new set of wound coils.

It will be understood that the apparatus of the present invention is also well suited for still greater automation than has been specifically described herein. For example, it would be possible to arrange the alignment member support means not only to hold and swing away the alignment member, but also to push it axially into the circular space between the guide members after a new set of wound coils has been hung onto the guide fingers of the drawing-in tool. Further, the transfer of wound coils from the winding arrangement to the drawing-in tool as well as the placement of empty stators onto the guide fingers could also be automated. These would be provided in addition to, without necessarily changing any of the presently described features of the present invention.

BRIEF DESCRIPTION OF THE DRAWINGS

The numerous objects and advantages of the present invention will become apparent from the detailed description of the preferred embodiment which follows, and which is to be taken together with the accompanying drawings in which:

FIG. 2 is a front elevational view of the apparatus viewed in the direction of the axis of the drawing-in tool and showing the apparatus with the parts in the operative position during which coils are being drawn into the stator grooves.

FIG. 3 is a top plan view of FIG. 2.

DETAILED DESCRIPTION OF THE PREFERRED EMBODIMENTS

Figure 1:
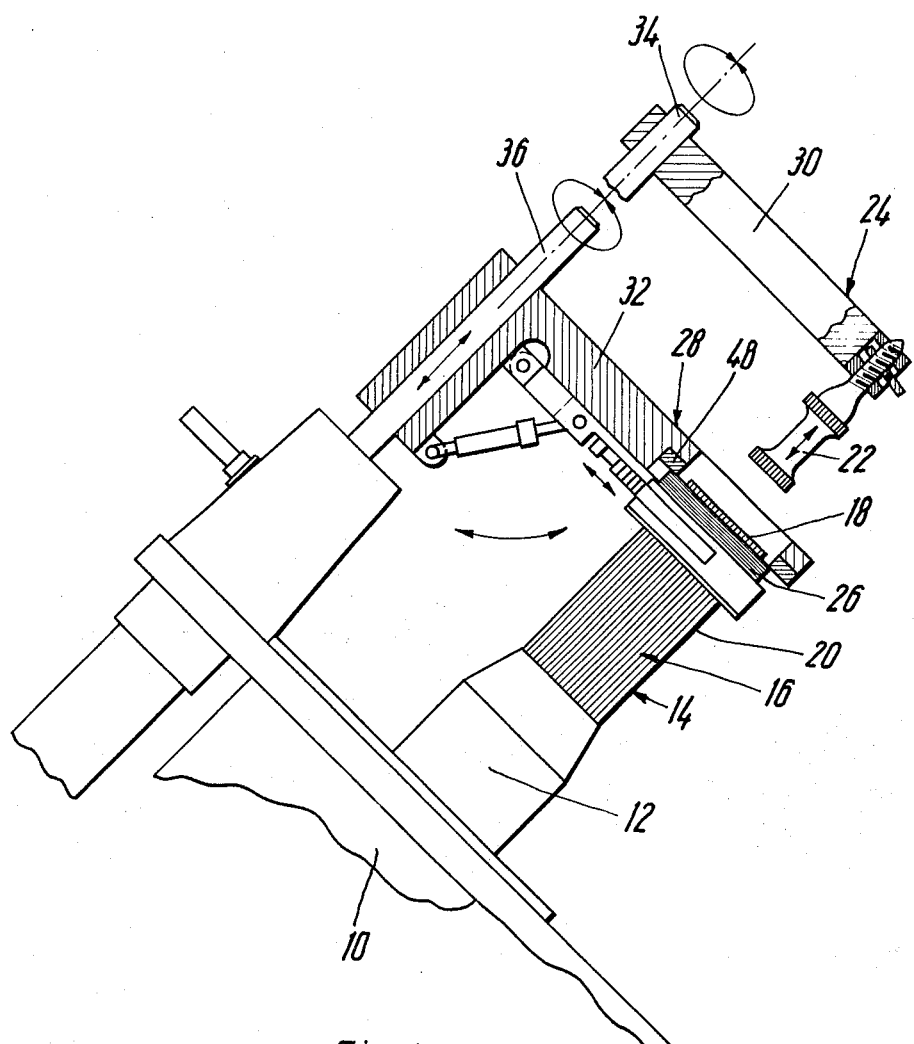
FIG. 1 is a partial side view of the front end of a drawing-in tool of the type described in detail in my said earlier patents but modified to include the features of the present invention, and wherein portions of this elevational view are broken way to show sections thereof.

Referring now to the drawings, like numerals represent like elements throughout the several views.

Figure 1A:
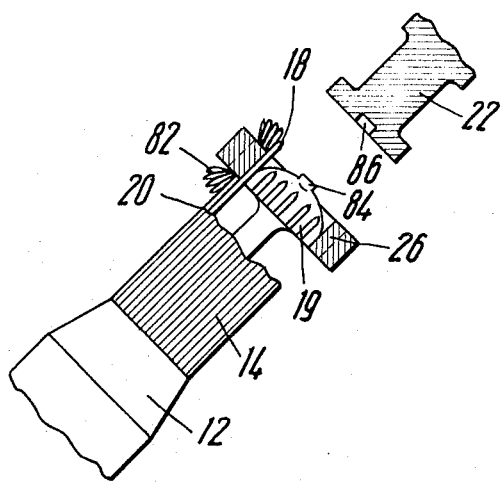
FIG. 1A shows a portion of FIG. 1 with certain elements removed to show further details of the apparatus.

In FIG. 1 and FIG. 1A, only the front part of the drawing-in apparatus of my previous U.S. Pat. No. 3,624,891 is shown. A portion of the support frame 10 is shown and it will be assumed that this is an apparatus of the type described in my said earlier patent in which the frame comprises a lower part and an upper part, the upper part being swivellable about a horizontal axis so that the central axis 12 of the upper part can be adjusted to any angle of inclination to the horizontal.

The guide fingers 16 of the drawing-in tool 14 are shown. These guide fingers actually comprise an inner ring 18 of guide fingers and an outer ring 20 of guide fingers, both groups being arranged in concentric circles about the axis 12, one complete guide finger 18 and 20 is visible in FIG. 1A. In the cylindrical space within the rings of guide fingers, a stripping member 19 moves along the axis 12 to urge the coils 82 (see FIG. 1A) into the grooves of stator 26. As shown in FIG. 1A, the stator 26 is pushed around the inner ring 18 until the bottom of the stator abuts the ends of the outer guide fingers 20. These details of the guide fingers and the stripping member are known per se, and for further details, reference is made to the said Hill U.S. Pat. No. 3,324,536.

Because in practice it is difficult to keep the relatively long guide fingers 18 parallel to each other, an alignment member 22 is introduced into the circle between the guide fingers after the coils are hung thereon. During the drawing-in process, the stripper member pushes the alignment member 22 ahead of it out of the space between the guide fingers. In the case of previous arrangements, the operator had to catch this alignment member 22 and place it aside and then re-insert it back between the guide fingers during the next cycle of operation. In the present invention, however, as illustrated in the preferred embodiment, there is provided an alignment member support means 24 for receiving and holding the alignment member 22 pushed out of the circle of guide fingers, which alignment support means will be described in greater detail below.

The stator 26 is pushed onto the guide fingers 18 after they have been aligned to be parallel to each other by means of the said alignment member 22. Heretofore, this stator had been secured onto the guide fingers only by supports which exerted a force against it preventing it from being pushed off of the guide fingers 18 during the drawing-in process. After drawing-in of the coils, however, the supports were released after which the stators were removed by hand. In the present invention, however, as illustrated in the preferred embodiment, this latter task is taken over by a stator support means referred to generally in FIG. 1 as 28.

It will be understood hereinafter that FIG. 1 is intended to illustrate schematically the principle of the present invention in highly simplified form as applied to the apparatus of my said previous patents while FIGS. 2–5 show in greater detail the preferred embodiment thereof.

Referring again to FIG. 1, in addition to the stator support means 28 there is provided an alignment member support means 24. The means 28 has a swivel arm 32 fixed onto swivel shaft 36 for movement therewith about the axis of shaft 36 and also axially parallel to the axis of shaft 36. The alignmemt member support means 24 comprises a swivel arm 30 mounted on a swivel shaft 34 for turning movement about the axis of the latter while the alignment member 22 thereon is mounted to move along the axis 12. As noted above, the preferred embodiment could also be arranged such that the swivel shaft 34 moved Parallel to its axis for movement of the alignment member 22 into and out of the space between the guide fingers 18. Also shown in FIG. 1 is a ring 48 which fits against one axial side of the stator 26.

Figure 4:
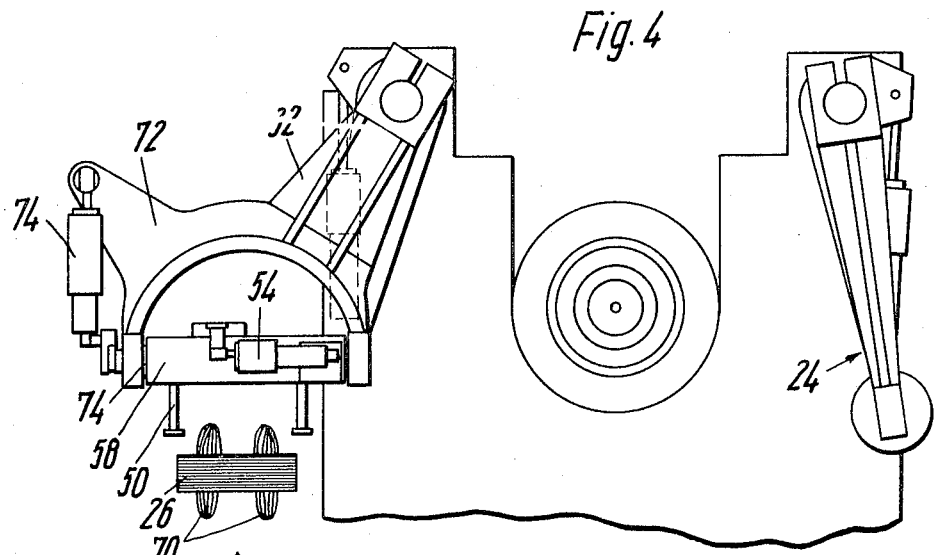
FIG. 4 is a front elevational view similar to FIG. 2 but showing the parts of the apparatus in the withdrawn position.
Figure 5:
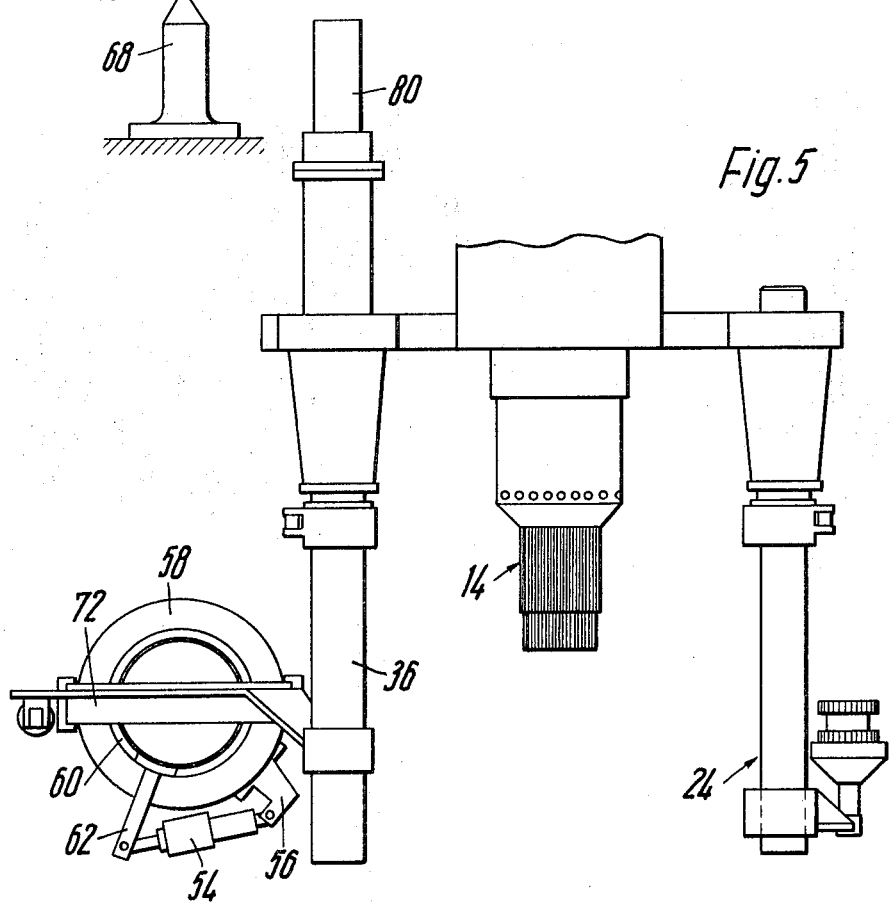
FIG. 5 is a top plan view of FIG. 4.

Referring now more particularly to FIGS. 2–5, there is shown a swivel arm 30 of the alignmemt member support means connected firmly to the swivel shaft 34 for rotation therewith between an operative positive as shown in FIGS. 2 and 3 and a withdrawn position as shown in FIGS. 4 and 5. A power cylinder 40 articulated on the frame 10 is also articulated on a crank 38 firmly connected to rotate with the swivel shaft 34 whereby the movement of power cylinder 40 effects swivelling movement of shaft 34. In the particular embodiment of FIGS. 2–5, the handle of the alignment member 22 is provided with a cental bore into which extends a bolt 42 attached to the free end of swivel arm 30. The friction between this bore in the handle of the alignment member and the bolt 42 will prevent the alignmemt member from slipping unintentionally off of the bolt 42. Between the handle and the bolt there is provided a ball and notch, not shown, which can further assist in removably connecting these parts together.

In a similar manner, for the stator support means 28 there is provided a power cylinder 44 articulated at one end to the frame 10 of the machine and articulated at its other end to a crank 46 which is fixed to the shaft 36 to rotate therewith whereby expansion and retraction of power cylinder 44 causes turning movement of the shaft 36, and hence also the swivel arm 32 about the axis of shaft 36.

The stator support means 28 serves not only to hold the stator on to the guide fingers but also to lift the stator off of the guide fingers after the wound coils have been inserted therein. For this purpose the stator support means 28 is placed firmly against one axial end of the stator while locking means engage the other side thereof. This is shown schematically in FIG. 1 wherein a ring 48 engages one side while the means engaging the other side of the stator are not shown. Referring now more specifically to FIGS. 2–5, there is provided a mounting ring 58 which engages one axial end of the stator and a locking means in the form of swivel rods 50 having locking plates 52 at the ends thereof which project axially from the mounting ring 58 and engage the other side of the stator. The locking plates 52 are firmly attached to the rods 50 for rotation therewith such that in one angular position of the rods 50 the plates 52 engage the stator as shown in FIG. 3 while in another angular position of rods 50 the plates 52 are turned to release the stator 26 as shown for example in FIG. 4. Turning movement of these rods 50 is provided by means of a power cylinder 54 which engages on the one hand a support 56 fixed to the mounting ring 58 and on the other hand a lever 62 which is firmly connected with a switch ring 60 which turns within the mounting plate 58. Rods 64, one for each rod 50, are fixed to the switch ring 60 to move therewith. Operative engagement between the rods 64 and the rods 50 are provided by switch forks 56 as best shown in FIG. 2. At their outer ends, switch forks 66 are rigidly connected to rods 50 to turn therewith while at their inner ends the forks are opened in the shape of a fork, between the arms of which fork is engaged the respective rod 64. Consequently, turning movement of switch ring 60 will turn the switch forks 66 and hence also the rods 50 and the locking plates 52.

After the drawing-in process has been completed, the stator support means removes the stator from the guide fingers, moves it to the withdrawn position shown in FIG. 4, turns it such that its axis is vertical and then drops it, while in this orientation onto a suitable receiving surface such as a conveyor, a mandrel or the like.

To accomplish this the stator support means comprises an outside frame 72 connected firmly to the swivel arm 32 for rotation therewith. The mounting ring 58 is connected to this outside frame 72 for rotation about axles 74. To provide this turning movement of the mounting ring 58 on axles 74, there is provided a power cylinder 76 which acts on the one hand against the outside frame 72 and on the other hand against a crank 78 firmly connected to the axles 74 to rotate therewith. As shown in FIG. 4, in the withdrawn position of the stator, the mounting ring 58 is positioned such that the axis of axles 74 is horizontal. In this condition the locking plates 52 release the stator 26 for said vertical movement onto an appropriate receiving surface. It will be noted that these axles 74 are so disposed that they will lie in a horizontal position regardless of the angle of inclination formed by the axis 12, and hence also the shaft 36, to the horizontal. Consequently, depending on the said angle of inclination, by simply operating the power cylinder 76 by a predetermined amount, the mounting plate 58 can be turned by an appropriate amount to place it in a generally horizontal plane such that the axis of stator 26 is vertical.

A power cylinder 80 is provided for moving the entire stator receiving means 26 axially for lifting the stator off of the drawing-in tool.

Although the operation of the invention will be apparent from the preceding discussion, in order to further facilitate an understanding of the invention, the operation will be summarized here.

At the beginning of the operation cycle, the operator takes the wound coils and hangs them onto appropriate guide fingers 18 and 20. A suitable means for winding these coils is shown for example in my U.S. Pat. No. 3,559,699 and a device for automatically transferring the wound coils from the winding apparatus to the drawing-in tool is shown for example in my U.S. Pat. No. 3,602,972. The operator then takes the alignment member 22 and removes it from its swivel arm 30 and inserts it centrally into the circular space between the guide fingers so as to precisely position these guide fingers. The stator 26 is then placed onto the guide fingers encircling the inner ring of guide fingers 18. The stator support means 28 is then turned about the axis of shaft 36 and the mounting ring 58 is turned by the necessary amount about axles 74 such that the mounting ring 58 can be placed firmly against the upper outer axial end of the stator while the locking plates 52 are operated to firmly engage the other side of the stator. The power cylinder 80 is then operated to pull the stator 26 down onto the drawing-in tool 14 by an appropriate amount. The alignment member support means 24 is then swung from its FIG. 4 position to its FIG. 2 position, but at this time it is still spaced axially from the upper end of alignmemt member 22. The drawing-in process then proceeds, as best shown in FIG. 1A, whereby the coils 82 are drawn into grooves in the stator 26 as the stripper member 19 moves axially through the stator 26. At this same time the alignment member 22 is pushed out of the space between guide fingers 18 and onto bolt 42. In fact, since the stripping member does not itself move completely through the mounting ring 58 and therefore cannot completely push the alignment member 22 completely through mounting ring 58, a projection 84 of for example five centimeters in length is attached centrally on the stripper member 19 and this pushes into a short blind bore 86 in the alignment member 22, thus pushing the latter axially beyond the mounting ring 58 whereby the alignment member 22 can then be swung away by means of swivel arm 30 back to its withdrawn position as shown in FIGS. 4 and 5. After that, the power cylinder 80 is operated to push the entire stator support means axially off of the drawing-in tool after which power cylinder 44 is operated to turn arm 32 to the withdrawn position of FIG. 4 after which power cylinder 76 is operated to turn mounting ring 58 about axles 74 such that the stator axis is vertical. Finally, power cylinder 54 is operated to release locking plates 52 whereby the stator 26 drops vertically to an appropriate receiving area such as the mandrel 68 in FIG. 4.

Mounting ring 58 is then turned back to its position concentric with frame 72 and the device is in its position for a further cycle.

Although the invention has been described in considerable detail with respect to the preferred embodiments of the invention, it will become apparent that the invention is capable of numerous variations and modifications apparent to those skilled in the art without departing from the spirit and scope of the invention.

I claim:

1. An apparatus for drawing wound coils onto stators comprising:

a frame, a plurality of parallel guide fingers extending from the frame and arranged in a circle and adapted to have hung on certain of said guide fingers wound coils to be inserted into grooves of a stator, means for positioning a stator concentrically relative to said circle of guide fingers, a stripper means movable axially in said circle, relative to at least some of said guide fingers for urging said hung wound coils into grooves of the stator, said means for positioning the stator comprising a stator support means for holding the stator while in an operative position on the guide fingers for receiving wound coils and also for holding the stator while in a withdrawn position in which the stator is positioned laterally of said axis away from said circle formed by the guide fingers, and said stator support means being movable between said operative and said withdrawn positions while holding the stator.

2. An apparatus according to claim 1, said stator support means being movable about a second axis spaced from and generally parallel to the axis of the said circle for movement of the stator between said operative and withdrawn positions and also along said second axis for moving the stator onto and off of said guide fingers.

3. An apparatus according to claim 2, in which the means for holding the stator comprises a mounting ring engagable with one axial side of the stator, rod means extending axially from the mounting ring, and locking plates associated with said rod means engaging the other axial side of the stator, and means for selectively engaging and disengaging said locking plates with said other stator side.

4. An apparatus according to claim 3, wherein the locking plates are fixed on the rod means, and including power means on the mounting ring for turning the rod means such that the locking plates engage or disengage the other side of the stator.

5. An apparatus according to claim 4, wherein said rod means comprises at least two rods fixed to respective switch forks in the mounting ring, a shift ring coaxial with the mounting ring, and engaging said switch forks, said power means arranged to turn the switch ring which in turn turns the switch forks and hence also the said rod means.

6. An apparatus according to claim 2, said stator support means comprising a shaft movable along said second axis, an arm connected to said shaft for movement therewith and extending radially from said shaft, a bifurcated frame at the other end of said arm, a mounting ring mounted between the two parts of said bifurcated frame for turning movement about a turning axis passing through said two parts, and said mounting ring including the said means for holding the stator.

7. An apparatus according to claim 6, said turning axis being located on said bifurcated frame such that it is substantially horizontal when the said arm has turned about said second axis to place the stator support means in said withdrawn position, such that the wound stator can be placed in a horizontal position with its central axis vertical by appropriate turning of the mounting ring about said turning axis regardless of the angle of inclination of the said second axis from the horizontal.

8. An apparatus according to claim 7, wherein said mounting ring engages one axial side of the stator and including rod means extending axially from the mounting ring, and locking plates associated with said rod means engaging the other axial side of the stator, and means for selectively engaging and disengaging said locking plates with said other stator side, and wherein the locking plates are releaseable at said withdrawn position such that the stator positioned with its axis vertical and the coil in the grooves thereof is dropped vertically downward onto a receiving means for further processing thereof.

9. An apparatus according to claim 1, including a guide finger alignment member movable along the said circle axis for precisely positioning the guide fingers during the drawing-in of the wound coils into the stator grooves.

10. An apparatus according to claim 9, including an alignmemt member support means supporting said alignment member and movable between an operative position in which the alignment member is on said circle axis and a withdrawn position in which the said alignment member is spaced laterally from said axis, away from the said circle formed by said guide fingers.

11. An apparatus according to claim 1, said stator support means being movable about a second axis spaced from and generally parallel to the axis of said circle for movement of the stator between the said operative and withdrawn positions and also along the said second axis for moving the stator onto and off of said guide fingers, a guide finger alignment member movable along the said circle axis for precisely positioning the guide fingers during the drawing-in of the wound coils into the stator grooves, an alignment member support means supporting said alignment member and movable about a third axis for moving the alignment member between an operative position in which the alignment member is on said circle axis and a withdrawn position in which the alignment member is spaced laterally from said circle axis, away from the said circle formed by the guide fingers.

12. An apparatus according to claim 11, including means on said stripper means for engaging the alignment member and moving it axially out of the circular space between the guide fingers as the stripper means moves axially through the stator.

* * * * *